H. T. G. FISCHER.
TRAP.
APPLICATION FILED SEPT. 13, 1912.
1,102,896.
Patented July 7, 1914.
2 SHEETS—SHEET 1.
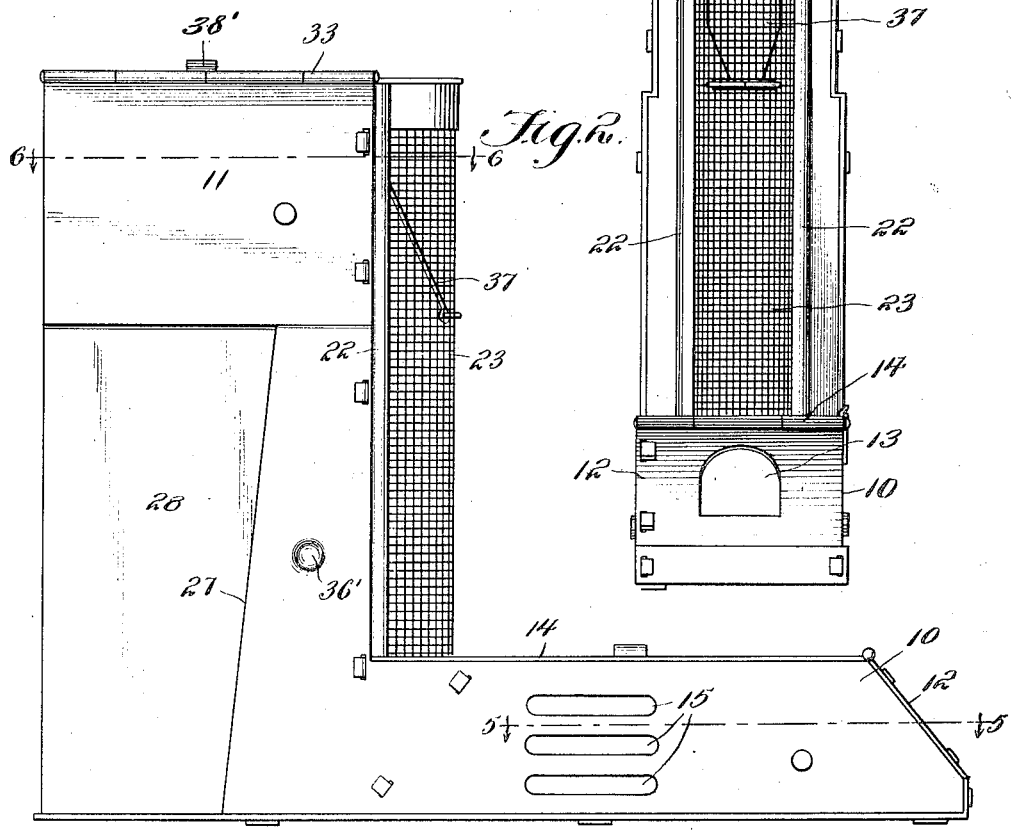
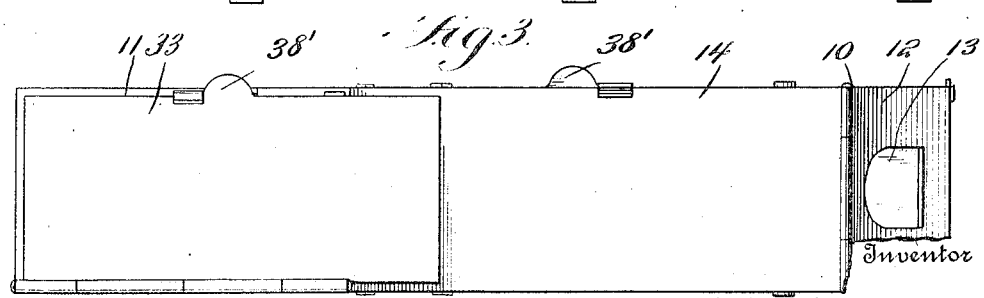
Witnesses
J. L. Wright
Henry T. G. Fischer, Inventor
By Victor J. Evans,
Attorney H. T. G. FISCHER.
TRAP.
APPLICATION FILED SEPT. 13, 1912.
1,102,896.
Patented July 7, 1914.
2 SHEETS—SHEET 2.
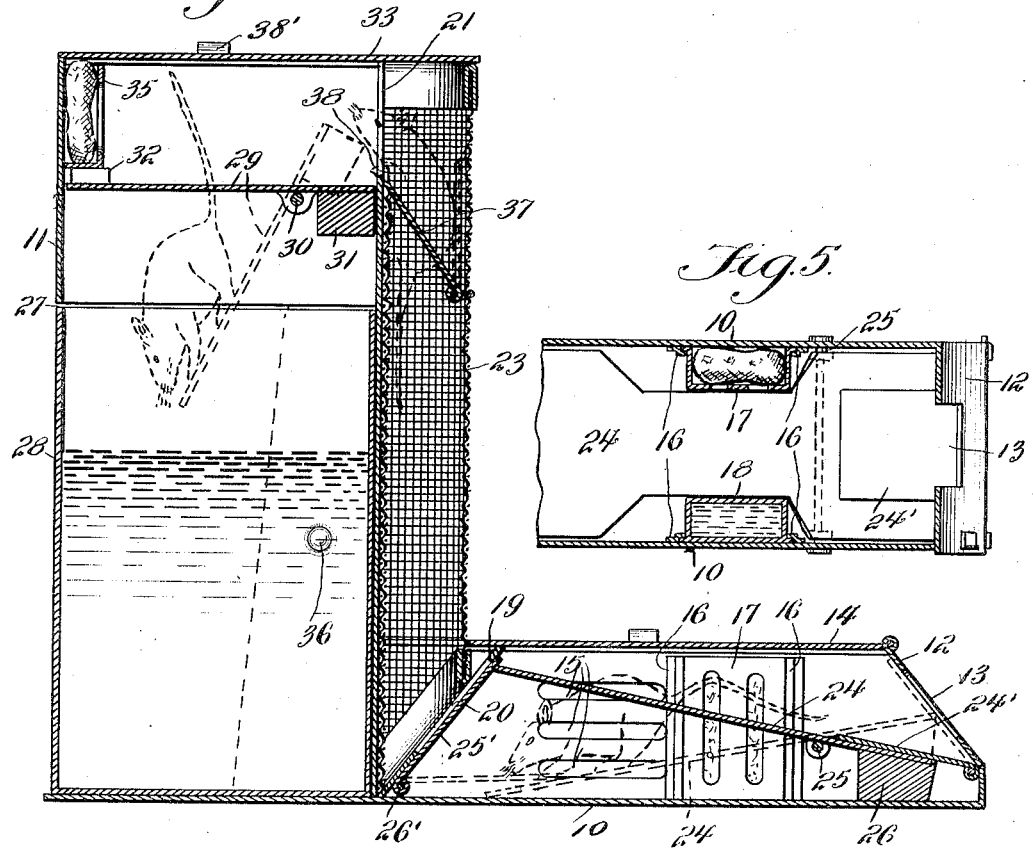
Witnesses
J. L. Wright
L. T. Parker
Inventor
Henry T. G. Fischer
By Victor J. Evans
Attorney

UNITED STATES PATENT OFFICE.

HENRY T. G. FISCHER, OF INDIANAPOLIS, INDIANA.

TRAP.

1,102,896.  Specification of Letters Patent.  Patented July 7, 1914.

Application filed September 13, 1912. Serial No. 720,263.

*To all whom it may concern:*

Be it known that I, HENRY T. G. FISCHER, a citizen of the United States, residing at Indianapolis, in the county of Marion and State of Indiana, have invented new and useful Improvements in Traps, of which the following is a specification.

The invention relates to traps, and more particularly to the class of animal, mouse or rat traps.

The primary object of the invention is the provision of a trap wherein an animal, mouse or rat is enticed into the same by bait and also through a passage-way for its delivery into a water reservoir for the drowning thereof.

Another object of the invention is the provision of a trap of this character wherein the animal after entering the same will be prevented from retreating and making an exit, thus assuring the positive catching thereof and the extermination of the same.

A further object of the invention is the provision of a trap which is automatic in operation, and that will positively catch the animal, mouse or rat, without liability of the escape of the same, and also which will exterminate the said animal, mouse or rat after entering the trap.

A still further object of the invention is the provision of a trap of this character which is simple in construction, reliable and positive in operation and also which is inexpensive in manufacture.

With these and other objects in view the invention consists in the construction, combination and arrangement of parts as will be hereinafter more fully described, illustrated in the accompanying drawings, and pointed out in the claims hereunto appended.

In the drawings:—Figure 1 is a side elevation of a trap constructed in accordance with the invention. Fig. 2 is a front elevation thereof. Fig. 3 is a top plan view. Fig. 4 is a vertical longitudinal sectional view through the same. Fig. 5 is a sectional view on the line 5—5 of Fig. 1. Fig. 6 is a sectional view on the line 6—6 of Fig. 1. Fig. 7 is a fragmentary horizontal sectional view through the trap showing in detail the manner of fastening the reservoir in the tower section.

Similar reference characters indicate corresponding parts throughout the several views in the drawings.

Referring to the drawings by numerals, the trap comprises a hollow body forming an entrance section 10 and a tower section 11, the same being integrally connected and disposed at right angles to each other, the section 10 being formed with a forwardly inclined front wall 12 provided with a central circular-shaped inlet opening 13 and a hinged top 14, the latter permitting access to be had to the interior of said section 10. Formed in the opposite side walls of the entrance section 10 are spaced longitudinally disposed slots 15 forming air openings. Fixed to the side walls at the inner faces of the section are vertical guide cleats 16 in which are removably engaged dry and wet bait holders 17 and 18 respectively, for receiving bait so that when the latter is placed therein, it will entice an animal, mouse or rat into the entrance section 10 to be disposed of in a manner presently described. It will be noted that when the top 14 is swung to open position access may be had to the bait holders for the placing of bait therein or the removal of the same therefrom. Arranged contiguous to the front wall of the tower section 11 and within the entrance section 10 is a rearwardly inclined partition 19 which extends across the entrance section and is provided with a central opening 20, while formed in the front wall of the tower section 11 at the upper end thereof is a circular-shaped opening 21 while connected to the outer face of the front wall of the tower section at opposite sides of the opening therein are cleats 22 in which are engaged a foraminous tube-like section 23, which forms a passage-way from the entrance section 10 to the upper portion of the tower section 11, the said tube being in communication with the openings 20 and 21, so that an animal, mouse or rat may pass from the said entrance section 10 into the said tower section 11 for the killing of the same in a manner presently described.

Arranged within the entrance 10 is a tilting platform 24, the same being connected with a transversely disposed pivot 25 journaled in the opposite side walls of said section, the pivot being connected with the said platform 24, near its forward end, which latter carries at its under side a weight 26, causing the said platform to normally rest at a forward inclination. Hinged to the front wall 12 of the entrance section 10 at the inner side thereof, is a swinging door 24', the latter co-acting with the forward, weighted end of the platform 24, so that when the latter is in normal position, the said door 24' will remain open, but on the tilting of the platform the door 24' will swing to position to close the opening 13 in the front wall of the entrance section. Hinged to the partition 19 is a door 25', the same being designed for swinging movement by means of the pivot 26' connecting it to the said partition, and this door is acted upon by the inner end of the platform 24, so that when the same is in a forwardly inclined position the door 25' closes the opening 20 in the said partition. It will be apparent that the animal, mouse or rat can enter the opening 13 and when passing through the entrance section 10 the platform 24 will be tilted shutting off an exit through the opening 13 in the front wall by reason of the closing of the door 24', but communication is established through the opening 20 between the entrance section 10 and the tube-like section 23 for the reason that the door 25' will gravitate to open position, thereby allowing the mouse, rat or animal to enter said tube-like section 23 so that it may pass into the tower section. Immediately upon the admission of the animal, mouse or rat into the tube-like section 23, the platform 24 will swing to normal position by reason of the weight 26 thereon, thus causing the closing of the door 25', thereby preventing the animal from gaining an exit through the opening 20 in the partition and at the same time the door 24' will automatically swing open, it being seen that the animal trapped can not retreat through the opening 13 in the front wall 12 for gaining freedom.

Formed in the rear and side walls of the tower section 11 is a doorway 27 through which is removably inserted a water reservoir 28, which is adapted to be filled with water so that when the animal passes within the tower section it will be automatically dropped after its admission to the said section, into the water for the drowning of the same. Arranged within the upper portion of the tower section 11 directly above the water reservoir is a drop gate or platform 29, the same being swingingly supported upon a pivot 30, which is journaled in the side walls of the said tower section and is connected to the gate or platform contiguous to one end edge thereof so that it may tilt forwardly for the dropping of an animal when treading thereon into the water contained within the reservoir. Fixed to the under side of the gate or platform 29 at the edge contiguous to the pivot 30 is the weight 31 which normally sustains the said gate or platform in substantially horizontal position but permitting it to swing downwardly when an animal treads thereon, thereby dropping the animal into the water reservoir for the drowning of the same. Fixed to the rear wall of the tower section interiorly thereof and in the path of movement of the gate or platform 29 is a stop bracket 32, which limits the upward swinging of the said gate or platform and thereby assures the normal position of the said platform so that an animal may tread thereon. Hinged to one side wall of the tower section 11 and normally closing the upper open end thereof is a top 33 which latter may be fastened in closed position in any suitable manner, this top 33 in lieu of being hinged may be slidably connected with the tower section if desired. Mounted on the inner face of the rear wall of the tower section directly opposite the opening 21 in the front wall thereof are spaced vertical cleats 34, in which is slidably engaged a removable foraminous bait holder 35, on which is adapted to be placed bait for enticing the animal into the tower section on to the tilting platform or gate. Access is had to the bait holder 35 by raising the top 33.

Suitably formed in each side wall of the reservoir 28 is an indentation 36, in which engages a locking lug 36', the same being struck in the side wall of the tower section 11, adjacent to the said side wall of the reservoir, and in this manner the reservoir is adapted to be locked with the opposite side walls of the tower section, so as to securely hold the water reservoir 28 therein. Arranged within the tube section 23 suitably hinged thereto is a trip gate 37 the free end of which is formed with prongs 38 which project into the path of the opening 21 in the front wall of the tower section, and in this manner the animal when passing upwardly through the tube section may readily pass the gate 37 for entrance into the tower section, but after passing beyond the gate such animal will be prevented from retreating within the tower section, thus assuring the positive entrance of the animal into the tower section. The hinged tops 11 and 43 respectively have integrally formed thereon finger tabs 38' to enable the convenient raising of the same.

From the foregoing description taken in connection with the accompanying drawings, it is thought that the construction and operation of the invention will be clearly understood, and therefore, a more extended explanation has been omitted.

What is claimed is:—

1. The combination with a trap having an entrance section and a tower section, the said tower and entrance sections being provided with openings, a tubular runway projected into the opening in the entrance section and detachably connected with the tower section for communication with the opening therein, gates hinged within the entrance section for closing the outer end thereof and the end of the runway projected into the same, and a single platform rigid throughout its area pivoted between the said gates and being of a length to have its ends project into the path of the doors to alternately open and close the same on the rocking of said platform during a single prescribed movement thereof.

2. In a trap having an entrance section provided with spaced doorways, doors pivoted within the entrance section for opening and closing the doorways, a platform mounted within the entrance section and having its ends projected into the path of the doors for automatically swinging the same alternately in open and closed positions, and a weight carried by the platform to normally hold the same in a position to close one of the doors while the other remains open.

In testimony whereof I affix my signature in presence of two witnesses.

HENRY T. G. FISCHER.

Witnesses:
WILLIAM GRAY,
GEO. J. RIEHM.